Feb. 28, 1950 J. H. ABBOTT 2,498,905
WELDING APPARATUS
Filed June 7, 1948 4 Sheets-Sheet 4

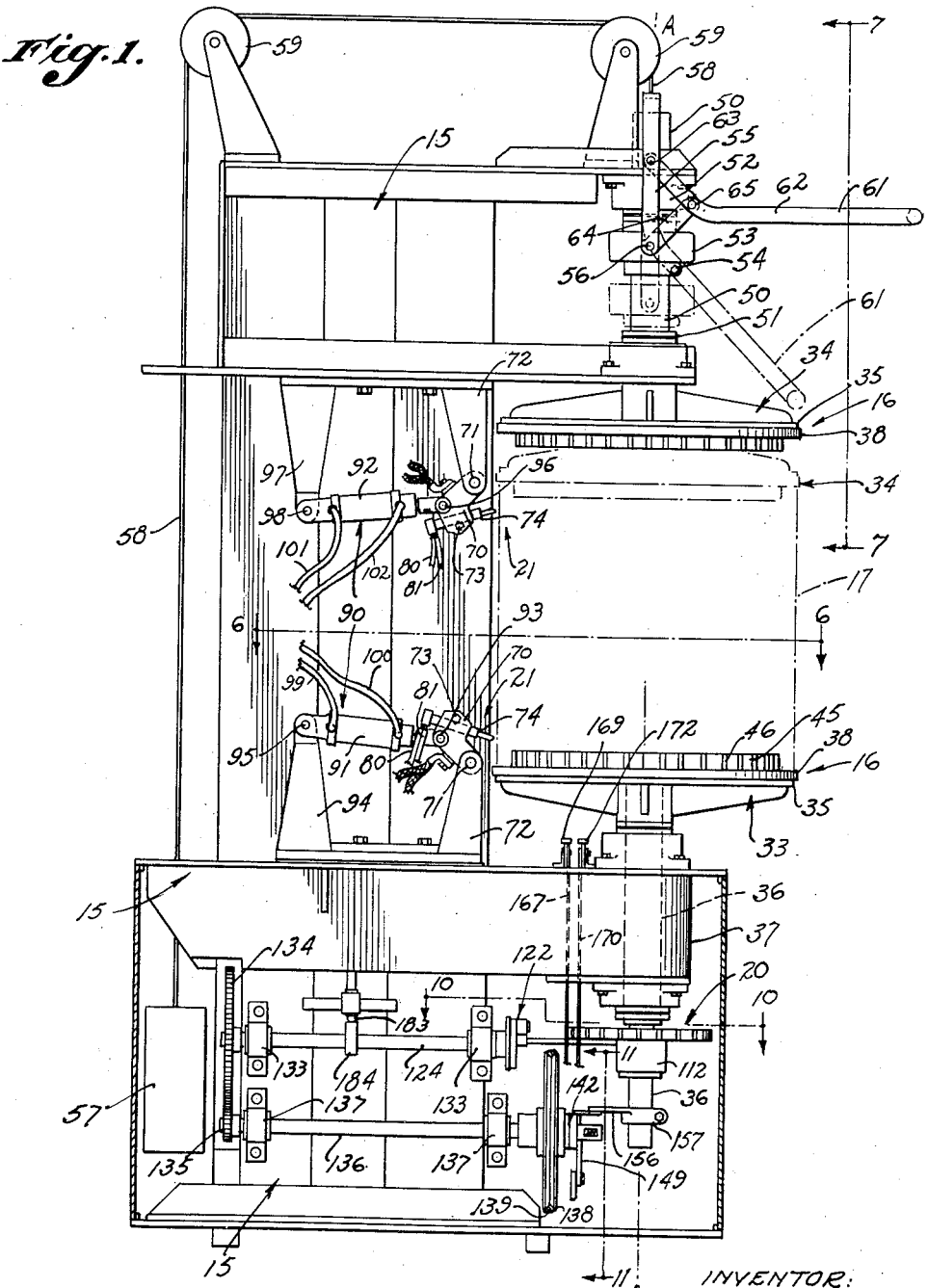

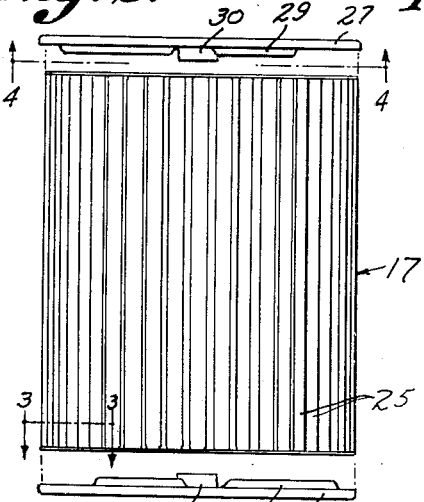
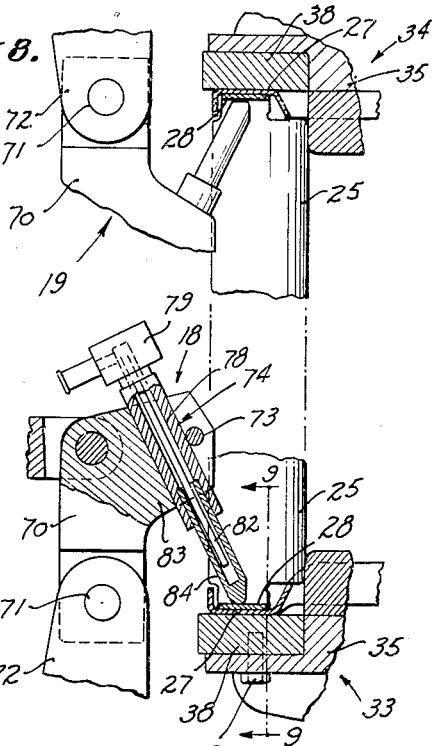
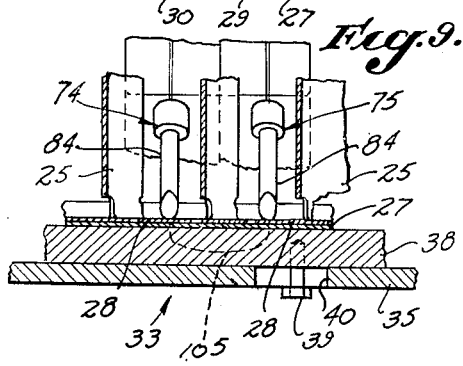
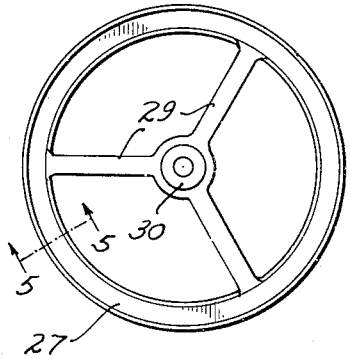
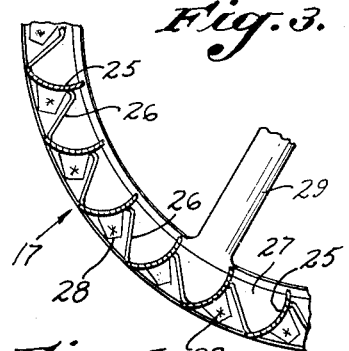
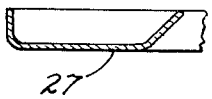

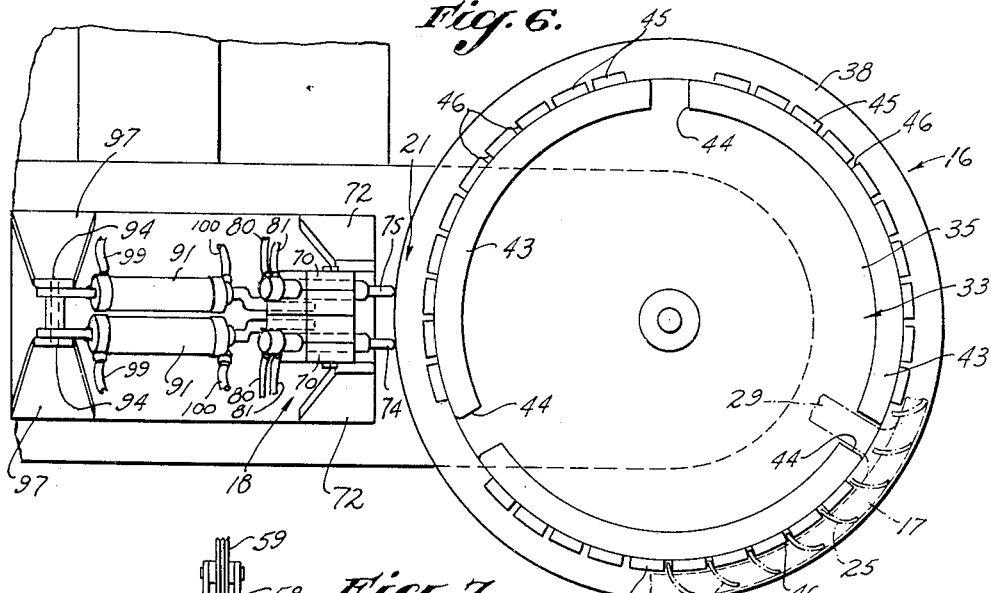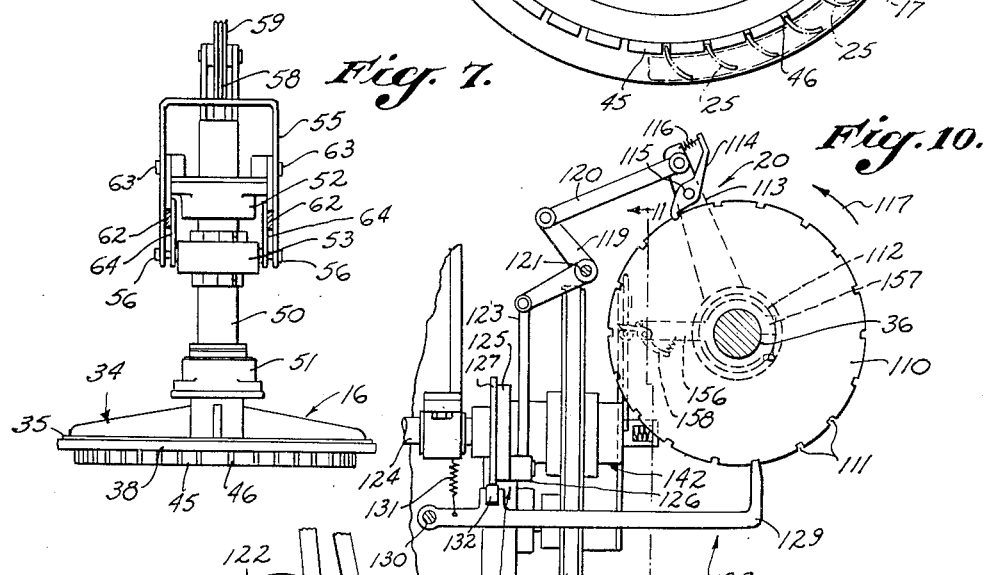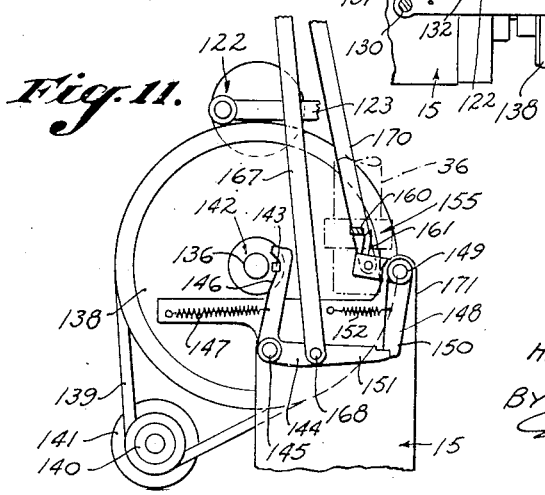

INVENTOR:
JOHN H. ABBOTT,
BY HIS ATTORNEYS
HARRIS, KIECH, FOSTER & HARRIS

Patented Feb. 28, 1950

2,498,905

UNITED STATES PATENT OFFICE 2,498,905

WELDING APPARATUS

John H. Abbott, Los Angeles, Calif., assignor to Utility Appliance Corp., Los Angeles, Calif., a corporation of California Application June 7, 1948, Serial No. 31,542

10 Claims. (Cl. 219—4)

My invention relates in general to a method of and apparatus for fabricating articles, and more particularly, to a method of and apparatus for assembling articles of sheet metal by spot welding the elements of the article together.

The invention finds particular utility in assembling the elements of such articles as the fans or rotors, commonly termed "wheels," which are incorporated in certain types of centrifugal blowers and I prefer to consider the invention in this connection herein for convenience in disclosing same. However, it will be understood that the invention is susceptible to other applications and that I do not intend to be limited to the particular illustrative application disclosed herein.

The rotor or wheel incorporated in a centrifugal blower of the type under consideration herein ordinarily comprises a plurality of circumferentially spaced, longitudinally extending blades or vanes having annular rims secured to the ends thereof, the rims being provided with radially extending spokes which terminate at their inner ends in hubs for mounting the wheel on a suitable shaft. Annular rims having the form of channels are frequently employed, the vanes being provided at their ends with tabs which are disposed in the channels and which are suitably secured to the bases thereof. In copending application Serial No. 619,030, filed September 28, 1945, now Patent No. 2,470,966, dated May 24, 1949, John W. Anger and I have disclosed a blower wheel with which the present invention may be practiced particularly advantageously, although it will be understood that the invention may be practiced with other articles without departing from the spirit thereof.

In assembling a blower wheel of the foregoing character, it is desirable to secure the vanes to the annular rims by a spot welding process, as by spot welding the tabs at the ends of the vanes to the bases of the rims, in order to reduce the cost of manufacture. However, due to the fact that the annular rims are channel shaped and due to the fact that the vanes are relatively closely spaced, insertion of the electrodes used in spot welding between the vanes and into the channel shaped rims has heretofore presented a difficult problem, a primary object of the present invention being to provide a simple solution for this problem.

It has been proposed to employ a welding gun or tool having a compound movement so that an electrode carried by the tool is first inserted between the vanes and then inserted into the channel shaped rim, and to employ an electrode having an offset tip, but I have found that such an arrangement is not satisfactory for several reasons, one of these being that employing a compound movement for the welding tool requires an undesirably and unnecessarily complicated actuating mechanism. Another reason is that an electrode having an offset tip cannot be cooled throughout its entire length by circulating water or other coolant therethrough, thus materially reducing the life of the electrode. In view of these considerations, an important object of my invention is to provide an apparatus which avoids the employment of a compound movement for the welding gun or tool, and which avoids the employment of an electrode having an offset tip.

More specifically, an object of the present invention is to provide an apparatus having a welding tool which is merely rotatable between an operative, or extended, and an inoperative, or retracted, position, the welding electrode being insertable between the vanes of the wheel into one of the channel shaped rims thereof along a circular path as the tool is rotated from its retracted position to its extended position. Another object in this connection is to provide an apparatus wherein the welding tool includes a straight, or substantially straight, electrode which may be cooled substantially throughout its entire length by the circulation of water or other coolant therethrough.

Another object of the invention is to provide a welding tool which is adapted to make two spot welds simultaneously so that two vanes may be welded to one of the annular rims at the same time. Another object in this connection is to provide an apparatus wherein the two electrodes of the welding tool are connected in series and wherein the annular rim of the wheel is adapted to contact a conductor for establishing a current path between the two electrodes.

A further object of the present invention is to provide an apparatus including a pair of welding tools of the foregoing character for welding both ends of a pair of vanes to the annular rims at opposite ends of the blower wheel simultaneously.

Another important object is to provide an apparatus of the foregoing character having retaining means for holding the vanes and the annular rims of the wheel in assembled relationship during the welding operation, and having intermittently-operating indexing means for periodically rotating the retaining means so as to bring successive vanes and successive portions of the annular rims into positions to be welded by the welding tools.

Another object is to provide an apparatus having means correlating the movements of the retaining means and the welding tools for causing rotation of the welding tools into their operative, or extended, positions after the retaining means, and the blower wheel held thereby, have been rotated by the indexing means, and for causing rotation of the welding tools back to their inoperative, or retracted, positions before further rotation of the retaining means and the wheel by the indexing means.

Still another object of the invention is to provide an apparatus having means for automatically deenergizing the indexing means after one complete revolution of the retaining means and the blower wheel held thereby so that the assembled wheel may be removed from the retaining means. A related object is to provide an apparatus wherein the indexing means is driven through a clutch which is disengaged automatically at the end of one complete revolution of the retaining means and the wheel held thereby, and which may subsequently be reengaged manually by an operator to initiate a new cycle of operation.

Still another important object of the present invention is to provide an apparatus wherein the retaining means is adapted to receive a blower wheel whose elements are to be welded together and which is adapted to hold the elements of the wheel in assembled relationship during the welding operation.

Another object is to provide a retaining means comprising a pair of spaced heads which are adapted to receive the blower wheel therebetween and which are adapted to hold the elements thereof in assembled relationship. A further object in this connection is to provide a retaining means wherein the heads are provided with a plurality of notches which are adapted to receive the spokes of the annular rims of the wheel, and wherein the heads are provided with a plurality of additional notches which are adapted to receive the vanes of the wheel. Still another object in this connection is to provide heads wherein the notches for the spokes and the vanes are so located that the vanes and the annular rims automatically assume their proper relative positions.

An additional object of the invention is to provide an apparatus wherein the indexing means for rotating the retaining means and a wheel held thereby are connected to only one of the heads of the retaining means, the other head being driven by the wheel itself.

The foregoing objects and advantages of my invention, together with various other objects and advantages thereof which will become apparent in the light of the following disclosure, may be attained through the utilization of the exemplary embodiment which is illustrated in the accompanying drawings and which is described in detail hereinafter. Referring to the drawings:

Fig. 1 is an elevational view of a welding apparatus which embodies the invention;

Fig. 2 is an elevational view showing a blower wheel which may be assembled with the apparatus;

Fig. 3 is a sectional view taken along the broken line 3—3 of Fig. 2;

Fig. 4 is a view showing a part of the blower wheel and is taken as indicated by the arrows 4—4 of Fig. 2;

Fig. 5 is a sectional view taken along the broken line 5—5 of Fig. 4;

Fig. 6 is a sectional view taken along the broken line 6—6 of Fig. 1 and showing a welding tool and part of a retaining means of the apparatus;

Fig. 7 is a fragmentary view taken along the broken line 7—7 of Fig. 1 and showing another part of the retaining means;

Fig. 8 is a fragmentary sectional view showing the structural details of a pair of welding tools of the apparatus and showing the manner in which the tools engage elements of the blower wheel;

Fig. 9 is a fragmentary sectional view taken along the broken line 9—9 of Fig. 8;

Figure 12:
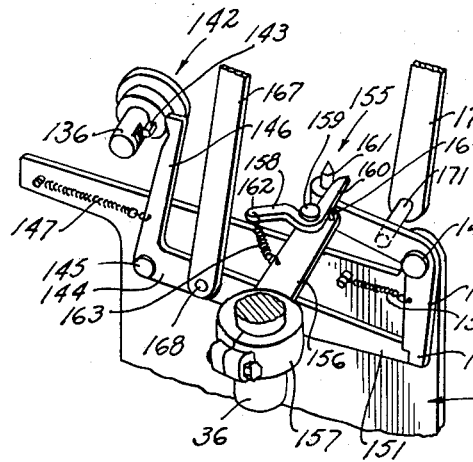
Figure 13:
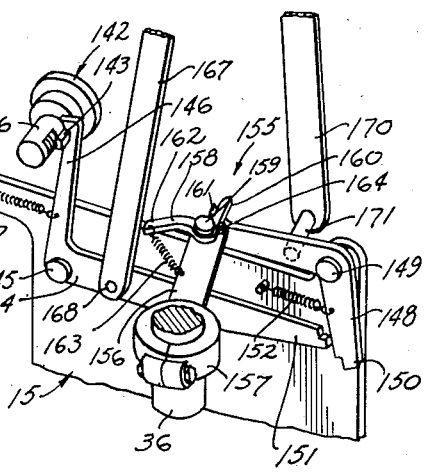
Figure 14:
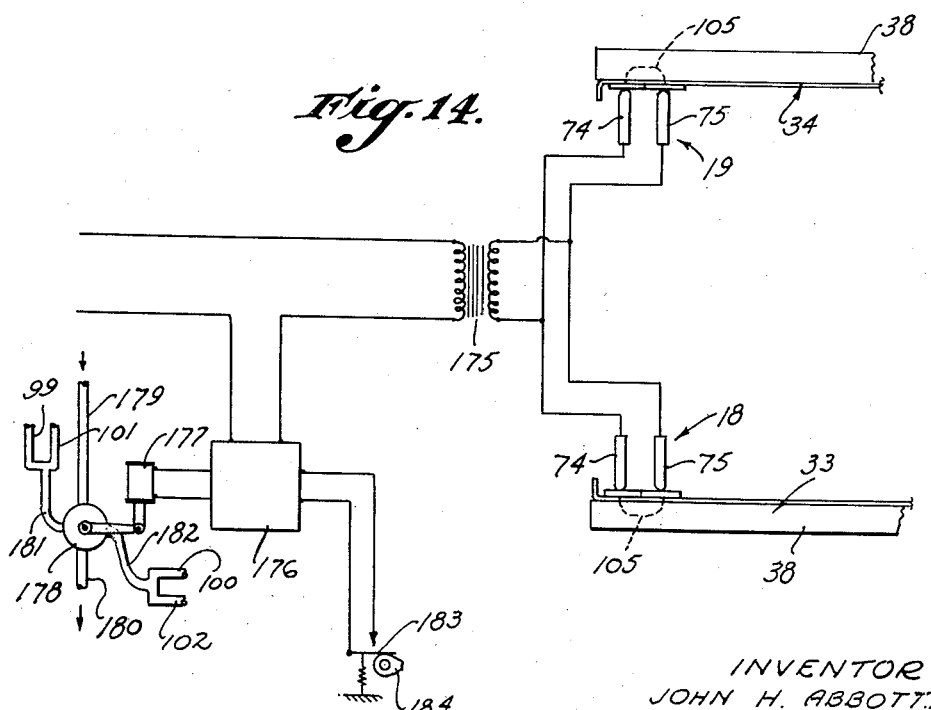

Figs. 10 and 11 are fragmentary sectional views taken along the broken lines 10—10 and 11—11, respectively, of Fig. 1 and showing an indexing means for rotating the aforementioned retaining means;

Figs. 12 and 13 are fragmentary perspective views illustrating the operation of a mechanism for operating a clutch through which the indexing means is driven; and, Fig. 14 is a schematic diagram showing an electrical circuit of the apparatus.

Referring particularly to Fig. 1 of the drawings, my welding apparatus includes a supporting structure or frame, indicated generally by the numeral 15, which carries rotatable retaining means 16 for holding in assembled relationship elements of a blower wheel or rotor 17 (shown in phantom) which are to be welded together by the apparatus. Carried by the frame 15 adjacent the retaining means 16 are welding tools or guns 18 and 19 for spot welding the elements of the blower wheel 17 together, the welding tools being movable between extended, or operative positions wherein they engage elements of the blower wheel, and retracted, or inoperative positions wherein they clear the blower wheel. With the welding tools 18 and 19 in their retracted positions, as shown in Fig. 1 of the drawings, the retaining means 16 may be rotated to bring successive elements of the blower wheel 17 into positions to be engaged by the welding tools. The apparatus also includes intermittently-operating indexing means, indicated generally by the numeral 20, for periodically rotating the retaining means 16 so as to move successive elements of the blower wheel 17 into positions to be engaged by the welding tools 18 and 19 so that the elements of the blower wheel may be progressively welded together in a manner to be described in more detail hereinafter. As a matter of convenience, movement of successive elements of the blower wheel 17 into positions to be engaged by the welding tools 18 and 19 will be referred to hereinafter as movement of the elements to an "operating station" adjacent which the welding tools are located, the operating station being indicated generally by the numeral 21.

In order to facilitate disclosing the structure and operation of my welding apparatus, it is desirable to consider first a typical blower wheel 17 which the apparatus is capable of assembling, such a wheel being illustrated in Figs. 2 to 5 of the drawings. The particular blower wheel illustrated in Figs. 2 to 5 is similar to the one disclosed in the aforesaid copending application Serial No. 619,030, although it will be understood that the present invention is not limited to application to such a blower wheel.

Referring now to Figs. 2 to 5 of the drawings, the blower wheel 17 illustrated therein includes a plurality of circumferentially spaced, longitudinally extending blades or vanes 25 which, in the particular construction illustrated, are interconnected by strips 26 formed integrally therewith to provide an integral vane structure. The blower wheel 17 also includes a pair of annular rims 27 which are to be secured to tabs 28 formed at the ends of the vanes 25 by spot welding in accordance with the present invention, the annular rims being channel shaped, as best shown in Fig. 5 of the drawings, and being adapted to receive the tabs at the ends of the vanes therein. The annular rims 27 are provided with radially extending spokes 29 which terminate at their inner ends in hubs 30, the latter being adapted to receive a shaft (not shown) on which the blower wheel is mounted when installed in a blower housing.

Considering the welding apparatus in more detail with particular reference to Figs. 1, 6 and 7 of the drawings, the retaining means 16, which is adapted to hold the annular rims 27 and the vane structure of the blower wheel 17 in assembled relationship during spot welding of the tabs 28 at the ends of the vanes 25 to the annular rims, includes a pair of retaining members or heads 33 and 34 which are spaced apart along an axis A—A and which are rotatable about such axis, the heads 33 and 34 being adapted to receive the blower wheel therebetween and being adapted to hold the elements thereof in assembled relationship as they are spot welded together. The head 33 includes a disc 35 which is rigidly connected to a shaft 36 so as to be rotatable therewith, the shaft being journalled in a bearing 37 which is carried by the frame 15 and being operatively connected to the indexing means 20 in a manner to be described in more detail hereinafter. As best shown in Figs. 6, 8 and 9 of the drawings, the disc 35 of the head 33 carries an annular ring 38 on which one of the annular rims 27 of the blower wheel 17 is adapted to rest, the ring 38 being formed of a suitable conductor of electricity, such as copper, for example. As best shown in Figs. 3 and 9 of the drawings, the ring 38 is secured to the disc 35 by bolts 39 which extend through circumferential slots 40 in the disc to permit circumferential adjustment of the ring relative to the disc for a reason to be discussed hereinafter.

The head 33, as best shown in Figs. 1 and 6 of the drawings, also includes a plurality of circumferentially spaced, arcuate members 43 which are rigidly connected to the disc 35, the members 43 providing notches 44 therebetween which are adapted to receive the radial spokes 29 of one of the annular rims 27 of the blower wheel to position such annular rim relative to the head 33. Adjacent the arcuate members 43 are arcuate members 45 having notches 46 therein which are adapted to receive portions of the ends of the vanes 25 of the blower wheel 17, the relative positions of the notches 44 and 46 being such that the annular rim 27 which engages the head 33 and the vanes 25 are properly positioned with respect to each other.

The head 34 of the retaining means 16 is identical to the head 33 and will not be described in detail, the various components of the head 34 being identified by the numerals used to identify the corresponding components of the head 33. As best shown in Fig. 1 of the drawings, the head 34 is carried by a shaft 50 which is journalled in bearings 51 and 52, this shaft being slidable axially in the bearings 51 and 52 to permit movement of the head 34 between a retracted position which is shown in solid lines in Fig. 1 of the drawings, and an extended position which is shown in broken lines therein. As best shown in Figs. 1 and 7 of the drawings, a collar 53 is suitably journalled on the shaft 50 intermediate the bearings 51 and 52, axial movement of the collar 53 being prevented by auxiliary collars 54 clamped or otherwise secured to the shaft at opposite ends of the collar 53. A yoke 55 is connected to the collar 53 by pivot pins 56. The head 34 is normally retained in its retracted position by a counterweight 57 which is connected to the yoke 55 by a cable 58 trained over pulleys 59. In order to move the head 34 into its extended position, I provide a handle 61 having arms 62 which are connected to the frame 15 by pivot pins 63. The arms 62 of the handle 61 are also connected to the collar 53 by links 64, the latter being connected to the collar by the pivot pins 56 and being connected to the respective arms of the handle by pivot pins 65. It will be apparent that in order to move the head 34 into its extended position, it is merely necessary to move the handle downwardly, as viewed in Fig. 1 of the drawings, to the position shown in broken lines, such downward movement of the handle being communicated to the shaft 50 carrying the head 34 through the links 64 and the collar 53. The links 64 and those portions of the arms 62 of the handle 61 which lie between the pivot pins 63 and 65 cooperate to provide a toggle mechanism for retaining the head 34 in its extended position.

Considering the operation of the retaining means 16, the operator of the apparatus first places one of the annular rims 27 of the blower wheel 17 to be assembled on the head 33 in such a manner that the spokes 29 thereof are disposed in the notches 44 between the arcuate members 43, thus positioning such rim properly with respect to the head 34. Subsequently, the operator places the vane structure, comprising the vanes 25 and integral interconnecting strips 26, on the previously positioned annular rim 27 in such a manner that portions of the vanes 25 are disposed in the notches 46 in the arcuate members 45, whereby the vanes are properly positioned with respect to the annular rim 27 automatically, this being an important feature of the invention. Subsequently, the operator places the second annular rim on the vane structure and moves the head 34 into its extended position by means of the handle 61, simultaneously adjusting the circumferential positions of the head 34 and the second annular rim until the vanes 25 and the spokes 29 of the second annular rim enter the proper notches in the head 34. The toggle mechanism formed by the arms 62 of the handle 61 and the links 64 retains the head 34 in its extended position so that the heads 33 and 34 hold the annular rim 27 and the vane structure of the blower wheel 17 therebetween in assembled relationship.

It will be understood that the foregoing procedure for positioning the blower wheel 17 between the heads 33 and 34 may be modified without departing from the spirit of the invention. For example, instead of positioning the annular rims 27 and the vane structure of the blower wheel in the retaining means 16 in the sequence outlined in the preceding paragraph, the annular rims and the vane structure may be preliminarily assembled, i. e., arranged in approximately their proper relative positions, at a location away from the apparatus and may then be placed on the head 33 as a unit, the head 34 subsequently being extended into engagement with the preliminary assembled wheel. It will be understood that with this procedure, it may be necessary to adjust the relative circumferential positions of the vane structure and the annular rims 27 to insure insertion of the vanes 25 and the spokes 29 of the rims into the proper notches in the heads 33 and 34. Preliminarily assembling the components of the blower wheel prior to placing the wheel in the retaining means 16 has an important advantage in that it permits more efficient operation of the apparatus since a second operator may be employed to make the preliminary assembly. Thus, the actual operator of the apparatus merely places the preliminary assembly in the retaining means 16, thereby reducing the time that the apparatus is idle.

The retaining means 16 is so positioned relative to the operating station 21 that the tabs 28 on successive vanes 25 of the blower wheel 17 and successive portions of the annular rims 27 thereof are moved to the operating station into positions to be welded by the welding tools 18 and 19 as the retaining means is rotated by the indexing means 20. The structure of the welding tools 18 and 19 will now be described and, since the two tools are of identical construction, only the tool 18 will be described in detail.

Referring particularly to Figs. 1, 6, 8 and 9 of the drawings, the welding tool 18 comprises a pair of electrode holders 70 on a shaft 71 which is journalled in bearing members 72 carried by the frame 15, the tool being rotatable between an extended position which is shown in Figs. 8 and 9, and a retracted position which is shown in Figs. 1 and 6. Secured to the respective electrode holders 70, as by clamping means 73, are welding electrodes 74 and 75, the electrodes being spaced apart a distance equal to the spacing of the tabs 28 on the vanes 25 of the blower wheel 17 so that they engage two of the tabs 28 simultaneously when the welding tool 18 is rotated into its extended position. As best shown in Figs. 8 and 9 of the drawings, the axis of rotation of the welding tool 18 is so located with respect to the operating station 21 that the electrodes 74 and 75 are inserted between the vanes 25 of the blower wheel 17 and into the channel-shaped rim 27 at one end thereof as the tool is rotated into its extended position, the electrodes 74 and 75 engaging and bearing against the tabs 28 on adjacent vanes 25 when the tool is fully extended. Thus, the electrodes 74 and 75 are brought into engagement with the tabs 28 to be spot welded to one of the annular rims 27 by a simple rotational movement, which is an important feature of the invention.

It will be noted that with this construction, I am able to employ straight, or substantially straight, welding electrodes, which is another important feature of the invention since this permits cooling the electrodes throughout substantially their entire lengths. As best shown in Fig. 8 of the drawings, the electrode 74 comprises a tubular member 78 having a head 79 thereon to which inlet and outlet lines 80 and 81 for a coolant such as water are connected, the inlet line 80 communicating with a tube 82 in the member 78 through a suitable passage (not shown specifically) in the head 79. The diameter of the tube 82 is less than the internal diameter of the tubular member 78 to provide an annular space 83 which communicates with the outlet line 81 through another passage in the head 79. The electrode 74 includes a hollow tip member 84 which is inserted into the tubular member 78, the tube 82 extending well into the tip member so as to conduct the coolant thereinto. Thus, the coolant flows substantially to the extreme tip of the electrode 74 and provides a cooling action throughout substantially the entire length thereof, thereby materially increasing the useful life of the electrode over that of an offset electrode having an uncooled tip. The electrodes 74 and 75 are identical so that the latter will not be described.

It will be understood that the electrodes 74 and 75 are of more or less conventional construction and, per se, form no part of the present invention. As hereinbefore stated, the novel welding tools 18 and 19 make possible the use of electrodes of such construction, which is an important feature of the invention.

As best shown in Fig. 1 of the drawings, the welding apparatus includes actuating means, indicated generally by the numeral 90, for rotating the welding tools 18 and 19 between their respective extended and retracted positions, the operation of the indexing means 20 and the actuating means being so correlated or synchronized that the actuating means is energized to rotate the welding tools into their respective extended positions each time the indexing means is energized to move elements of the blower wheel 17 to the operating station 21. In the particular construction illustrated, the actuating means 90 comprises pairs of fluid operated actuating devices 91 and 92 which are operatively connected to the welding tools 18 and 19, respectively, the actuating devices 91 being pivotally connected to the respective electrode holders of the welding tool 18 by pins 93, and being pivotally connected to a bracket 94 carried by the frame 15 by pins 95. Similarly, the actuating devices 92 are pivotally connected to the electrode holders of the welding tool 19 by pins 96, and are pivotally connected to a bracket 97 carried by the frame by pins 98.

In the particular construction illustrated, the actuating devices 91 and 92 comprise cylinders having pistons (not shown) therein, the devices having fluid lines connected to opposite ends of their respective cylinders. The fluid lines connected to the cylinders of the actuating devices 91 are identified by the numerals 99 and 100 and those connected to the cylinders of the devices 92 are identified by the numerals 101 and 102. Any desired fluid, such as air, for example, may be employed to operate the actuating devices 91 and 92 as is well known in the art. The manner in which the operating fluid for the actuating devices is controlled will be discussed in more detail hereinafter.

When the actuating devices 91 and 92 are energized to rotate the welding tools 18 and 19 into their extended positions, the welded electrodes 74 and 75 carried by the respective tools engage the tabs 28 at opposite ends of adjacent vanes 25 of the blower wheel 17, the forces applied to the tools being sufficient to cause the electrodes to press the tabs into positive electrical contact with the bases of the channel-shaped rims 27 of the blower wheel and to press the bases of the rims into positive electrical contact with the annular conductors 38 carried by the heads 33 and 34. As will be discussed in more detail hereinafter, the electrodes 74 and 75 of each of the welding tools 18 and 19 are connected in series so that the welding current flows from one electrode to the other in a generally U-shaped path 105, as indicated in Fig. 9 of the drawings. More specifically, the welding current flows from one of the electrodes through the tab 28 engaged thereby, through the base of the corresponding rim 27, through the annular conductor 38 along the U-shaped path 105, back through the base of the rim, through the tab engaged by the other electrode, and thence into the other electrode. Thus, I am able to make two spot welds simultaneously, i. e., I am able to spot weld the tabs 28 at the ends of two vanes to the corresponding annular rim 27 simultaneously, with only two electrodes, which is an important feature of the invention.

It will be recalled that the annular conductor 38 may be moved circumferentially with respect to the corresponding heads 33 and 34 by virtue of the provision of the slots 40 through which the bolts 39 for securing the annular conductors extend. Thus, the circumferential positions of the annular conductors 38 may be varied to present fresh surfaces for contact with the annular rims 27 in the event that the annular conductors become pitted at the original points of contact, which is another feature of the invention.

The indexing means 20 for periodically rotating the retaining means 16 in timed relationship with the operation of the actuating means 90 for the welding tools 18 and 19 will now be described in detail with particular reference to Figs. 1 and 10 to 13 of the drawings. As best shown in Figs. 1 and 10, the indexing means 20 includes an indexing disc 110 which is rigidly connected to the shaft 36 carrying the head 33 so as to be rotatable therewith, the indexing disc being provided with a plurality of circumferentially spaced notches 111 in its edge and providing, in effect, a ratchet wheel. Journalled on the shaft 36 is a collar 112 having an indexing arm 113 which carries a pawl 114, as best shown in Fig. 10 of the drawings, the pawl being pivotally connected to the arm 113 by a pin 115. The pawl 114 is adapted to be inserted into the notches 111 in the indexing disc 110 by a spring 116, the latter being connected at one end to the pawl and at its other end to the arm 113. The pawl 114 is adapted to rotate the indexing disc 110 in the direction of the arrow 117 when the arm 113 is rotated in the same direction, and is adapted to disengage the notches 111 in the disc when the arm is rotated in the opposite direction so that an intermittent, unidirectional movement of the indexing disc is obtained as will be apparent to those skilled in the art.

The number of notches 111 in the indexing disc 110 corresponds to the number of spot welding operations to be performed on the blower wheel 17 and, since two vanes of the wheel are welded to the annular rims 27 during each spot welding operation in the particular construction illustrated, the number of notches in the indexing disc must be equal to one-half the number of vanes. It will be apparent that if the indexing arm 113 carrying the pawl 114 is oscillated through an angle equal to the angle between adjacent notches 111 in the indexing disc 110, the indexing disc will be rotated through an angle equal to the angle between adjacent notches for each complete oscillation of the arm 113. The manner in which the indexing arm 113 is oscillated will be described in the following paragraph.

As best shown in Fig. 10 of the drawings, the indexing arm 113 is pivotally connected to one arm of a bell crank 119 by a link 120, the bell crank being rotatable on a shaft 121 carried by the frame 15. The bell crank 119 is oscillated by an eccentric 122 through a link 123 which is pivotally connected to the other arm thereof, the eccentric being fixed on a shaft 124. As best shown in Fig. 10, the eccentric 122 comprises a disc 125 which carries a pin 126 journalling one end of the link 123. The eccentric 122 also provides a cam surface 127 for a purpose to be described hereinafter. It will be apparent that as the shaft 124 rotates, the eccentric 122 oscillates the bell crank 119 through the link 123 so that the bell crank, in turn, oscillates the indexing arm 113 through the link 120, thereby periodically rotating the indexing disc 110 to bring successive portions of the blower wheel 17 into positions to be engaged by the welding tools 18 and 19.

In order to insure accurate indexing of the blower wheel 17 with respect to the operating station 21, I prefer to provide means indicated generally by the numeral 128 for latching the indexing disc 110 in place after each advance by the pawl 114. As best shown in Fig. 10 of the drawings, the latching means 128 includes a latching arm 129 which is pivotally connected to a portion of the frame 15 at 130 and which is insertable into the notches 111 in the indexing disc, the latching means also including a spring 131 for inserting the end of the latching arm in the notches in the disc. The latching arm 129 carries a rotatable cam follower 132 which engages the cam surface 127 on the eccentric 122, the cam surface being designed to effect withdrawal of the end of the latching arm from the notches in the indexing disc each time the indexing disc is advanced by the pawl 114.

As best shown in Fig. 1 of the drawings, the shaft 124 is journalled in bearings 133 carried by the frame 15 and has fixed thereon a gear 134 which is meshed with a gear 135 fixed on a shaft 136, the latter being journalled in bearings 137 carried by the frame. Journalled on the shaft 136 is a pulley 138 which, as best shown in Fig. 11 of the drawings, has a belt 139 trained therearound, the belt being trained around a drive pulley 140 which may be driven by any suitable means, such as an electric motor 141. The shaft 136 carries a clutch 142 which, when engaged, provides a driving connection between the pulley 138 and this shaft, and, when disengaged, permits free rotation of the pulley 138, the clutch being disengageable to interrupt operation of the apparatus as will be discussed in more detail hereinafter. Any desired type of clutch may be employed, the particular clutch 142 illustrated, being disengageable by axial movement of a dog 143.

As best shown in Figs. 11, 12 and 13 of the drawings, the clutch dog 143 is movable axially to disengage the clutch 142 by a clutch disengaging member 144 which is pivotally connected to a portion of the frame 15 at 145. The clutch disengaging member 144 is provided with an arm 146 which is insertable between the clutch dog 143 and the body of the clutch 142 to move the clutch dog axially and thus disengage the clutch, the arm 146 being so inserted between the clutch dog and the body of the clutch upon counterclockwise rotation, as viewed in Fig. 11 of the drawings, of the disengaging member 144. The disengaging member 144 is biased for rotation in the counterclockwise direction, again as viewed in Fig. 11 of the drawings, by a spring 147.

The clutch disengaging member 144 is normally held in a retracted, or inoperative, position by a latching member 148 which is pivotally connected to a portion of the frame 15 at 149, the latching member having an arm 150 which is adapted to engage an arm 151 of the disengaging member 144 to hold the latter in its retracted position. Referring particularly to Figs. 11, 12 and 13 of the drawings, it will be apparent that if the latching member 148 is rotated in the counterclockwise direction, the arm 150 thereof will disengage the arm 151 of the clutch disengaging member 144 so that the spring 147 rotates the latter to disengage the clutch 142 in the manner described. The latching member 148 is normally held in a position such that the arm 150 thereof engages the arm 151 of the clutch disengaging member 144 by a spring 152.

Referring particularly to Figs. 11 to 13 of the drawings, the shaft 36 carrying the indexing disc 110 also carries tripping means, indicated generally by the numeral 155, for releasing the latching member 148 upon completion of the assembly of the blower wheel 17 so as to produce disengagement of the clutch 142 and thus produce deenergization of the indexing means 20. As best shown in Figs. 12 and 13 of the drawings, the releasing means 155 includes a tripping arm 156 which is carried by a collar 157 clamped or otherwise secured to the shaft 36. The arm 156 carries a tripping element 158 which is pivotally connected thereto at 159, the tripping element having an arm 160 which is adapted to engage an arm 161 of the latching member 148 to release the latter, and having an arm 162 which is connected to the tripping arm 156 by a spring 163.

Referring particularly to Fig. 12 of the drawings, as the blower wheel 17 is rotated into position for the welding tools 18 and 19 to make the last spot welds, the arm 160 of the tripping element 158 engages the arm 161 of the latching member 148. Frictional resistance prevents rotation of the latching member 148 at this stage so that the tripping element 158 rotates against the action of the spring 163, such rotation of the tripping element being limited by a stop 164 carried by the tripping arm 156. When the tripping element 158 engages the stop 164, further rotation of the shaft 36 carrying the tripping arm 156 causes the tripping element 158 to rotate the latching member 148 into a position to release the clutch disengaging member 144, whereupon the latter operates to disengage the clutch 142 in the manner previously described. As best shown in Fig. 13 of the drawings, as the tripping element 158 rotates the latching member 148, the arm 161 of the latching member moves downwardly to permit the arm 160 of the tripping element to ride over and pass the arm 161 so that the tripping element disengages the latching member 148. Thus, the various elements of the tripping means 155 automatically occupy positions such that they will be clear of the latching member 148 when the latter is restored to its operative position, which is an important feature of the invention.

After the tripping means 155 has actuated the latching member 148 so that the clutch disengaging member 144 disengages the clutch 142 upon completion of the welding cycle, the operator removes the assembled blower wheel 17 from the retaining means 16 and places the elements of another blower wheel therein as previously described. In order to re-energize the indexing means 20 so that operation of the apparatus will be resumed, it is necessary for the operator to rotate the clutch disengaging member 144 to its retracted, or inoperative, position so that it may be retained in such position by the latching member 148. For this purpose, I provide a handle 167 which is pivotally connected at one end to the clutch disengaging member 144, as indicated by the numeral 168. As will be apparent from Figs. 11 to 13 of the drawings, downward movement of the handle 167 will rotate the clutch disengaging member 144 into its retracted position, the latching member 148 being adapted to latch it in such position automatically under the action of the spring 152. Preferably, the handle 167 is provided with a suitable knob 169, or the like, at its upper end, as best shown in Fig. 1, so that it may be grasped readily by the operator. Thus, it will be apparent that in order to energize the indexing means 20, it is merely necessary to depress the handle 167 to permit the latching member 148 to latch the clutch disengaging member 144 in its retracted position.

As best shown in Figs. 1 and 11 to 13 of the drawings, I prefer to provide another handle, identified by the numeral 170, for de-energizing the indexing means 20 during the welding cycle if desired. The handle 170 is pivotally connected at it lower end to the latching member 148, as indicated by the numeral 171, in such a manner that downward movement of the handle 170 will rotate the latching member 148 to release the clutch disengaging member 144, whereupon the latter operates to disengage the clutch 142 in the manner previously described. Preferably, the handle 170 is provided with a suitable knob 172 or the like at its upper end.

The foregoing completes the description of the structure of the welding apparatus and the electrical circuit for controlling the operation thereof will now be described in detail. Referring particularly to Fig. 14 of the drawings, the electrodes 74 and 75 of each of the welding tools 18 and 19 are connected in series with the secondary winding of a transformer 175 which supplies the welding current, the primary winding of the transformer being connected to a source of alternating current through a timer 176. As is well known in the art, the timer controls the duration of the welding current supplied to the electrodes, and since any suitable timer may be employed, the details thereof are not shown. The timer 176 also controls the operation of the actuating means 90 for extending and retracting the welding tools 18 and 19 through a solenoid 177 which operates a selector valve 178, the latter having inlet and outlet lines 179 and 180 connected thereto. The inlet line 179 may be connected to a suitable source of operating fluid under pressure, the operating fluid being air, for example. Also connected to the selector valve are auxiliary lines 181 and 182, the former being connected to the lines 99 and 101 leading to the respective actuating devices 91 and 92, and the latter being connected to the lines 100 and 102 leading to the respective actuating devices. The timer 176 is controlled by a switch 183 which is normally open and which is adapted to be closed by a cam 184 on the shaft 124 which drives the indexing means 20, the cam 184 being adapted to close the switch 183 to operate the timer as successive elements of the blower wheel 17 are rotated into the operating station 21 by the indexing means.

Considering the over-all operation of the welding apparatus, it will be assumed that the operator has placed the elements of the blower wheel 17 to be assembled in the retaining means 16 in the manner previously described. In order to initiate operation of the machine, it is merely necessary for the operator to move the starting handle 167 downwardly, as viewed in the drawings, so as to rotate the clutch disengaging member 144 into its retracted position, the clutch disengaging member being latched in its retracted position automatically by the latching member 148 as previously discussed. This operation results in engagement of the clutch 142 to actuate the indexing means 20 through the previously-described intervening mechanism. As a result, the indexing means periodically rotates the retaining means 16 to move successive portions of the blower wheel 17 to the operating station 21. As each portion of the blower wheel is moved to the operating station, the cam 184 on the shaft 124 closes the switch 183 to operate the timer 176, whereupon the timer energizes the solenoid 177 controlling the selector valve 178. The latter then provides fluid communication between the inlet line 179 and the lines 99 and 101 leading to the respective actuating devices 91 and 92 so that the latter rotate the welding tools 18 and 19 into their extended, or operative positions. The valve 178 of course simultaneously connects the lines 100 and 102 to the outlet line 180. Subsequently, the timer 176 provides a flow of welding current to the electrodes 74 and 75 for a predetermined time interval to spot weld the tabs 28 engaged by the electrodes to the corresponding rims 27 of the blower wheel. Thereafter, the cam 184 permits the switch 183 to open so that the solenoid 177 is de-energized and thus restores the selector valve 178 to its original position, the selector valve then providing fluid communication between the inlet line 179 and the lines 100 and 102 leading to the actuating devices 91 and 92 so that the latter return the welding tools 18 and 19 to their retracted, or inoperative positions. Simultaneously, the selector valve 178 connects the lines 99 and 101 to the outlet line 180. The retaining means 16 is then rotated again by the indexing means 20 to bring the next portion of the blower wheel 17 to the operating station 21 into a position to be welded by the tools 18 and 19.

The foregoing sequence of operations is repeated until the retaining means 16 has been rotated through one complete revolution by the indexing means 20 so that all of the tabs 28 at the ends of the vanes of the blower wheel have been welded to the corresponding annular rims 27. As previously indicated, as the indexing means 20 rotates the blower wheel into position to make the last weld, the tripping means 155 releases the latching member 148 so that the clutch disengaging member 144 disengages the clutch 142 to stop the apparatus, the tripping means disengaging the latching member 148 automatically in preparation for another operating cycle. The operator of the apparatus then removes the assembled blower wheel from the retaining means 16 and places the components of another wheel therein, whereupon the preceding operating cycle is repeated.

An outstanding advantage of the apparatus hereinbefore disclosed is that articles such as the blower wheel 17 may be assembled by spot welding in an extremely short time. For example, I have found that when the components of the blower wheel are preliminarily assembled before being placed in the retaining means 16 to minimize the time that the apparatus is idle, the wheels may be assembled at a rate exceeding one per minute. The production rate depends, of course, on the number of spot welds to be made, the foregoing rate being for blower wheels requiring 84 spot welds, i. e., for blower wheels having 42 vanes each spot welded at both ends.

Another advantage of the apparatus is due to the fact that the simple rotational movement employed for the welding tools 18 and 19 permits the use of straight electrodes 74 and 75 which may be cooled throughout substantially their entire lengths as hereinbefore discussed. I have found that as many as 20,000 spot welds may be made with each tip member 84 before replacement thereof is necessary. On the other hand, when offset tips, which can be cooled throughout only a portion of their lengths, are employed, replacement after 500 spot welds is frequently necessary.

Although I have disclosed an exemplary embodiment of the invention herein for purposes of illustration, it will be understood that various changes, modifications and substitutions may be incorporated therein without necessarily departing from the spirit of the invention, and I hereby reserve the right to all such changes, modifications and substitutions as properly come within the scope of the invention as set forth in the appended claims.

I claim as my invention:

1. In an apparatus of the character described, the combination of: a structure providing an operating station; intermittently-operating indexing means for moving successive portions of a work piece to said operating station; intermittently-operating latching means in mechanically operative relationship with said indexing means for positively retaining each portion of the work piece in said operating station; a welding tool pivotally connected to said structure adjacent said operating station for rotation between extended and retracted positions, said tool including an electrode which is adapted to engage a portion of the work piece at said operating station when said tool is in its extended position, and which is spaced from the work piece when said tool is in its retracted position; and means for rotating said welding tool from its retracted position to its extended position and back to its retracted position after each portion of the work piece has been moved to said operating station by said indexing means.

2. In an apparatus of the character described, the combination of: a structure providing an operating station; indexing means for rotating successive portions of a work piece to said operating station; intermittently-operating latching means in mechanically operative relationship with said indexing means for positively retaining each portion of the work piece in said operating station; an electrode holder pivotally connected to said structure adjacent said operating station for rotation between extended and retracted positions; a welding electrode carried by said electrode holder, said electrode being adapted to engage a portion of the work piece at said operating station when said electrode holder is in its extended position, and being adapted to clear the work piece when said electrode holder is in its retracted position; actuating means for rotating said electrode holder between said extended and retracted positions; and means correlating the operation of said indexing means and said actuating means for energizing said actuating means after each portion of the work piece has been rotated to said operating station by said indexing means.

3. In an apparatus of the character described, the combination of: a structure providing an operating station; a conductor of electricity adapted to be contacted by a work piece; means for moving said conductor and the work piece to said operating station; a welding tool carried by said structure adjacent said operating station and movable relative thereto between extended and retracted positions, said tool comprising a pair of spaced welding electrodes which are adapted to engage the work piece at a pair of spaced points when said tool is in its extended position, and which are adapted to clear the work piece when said tool is in its retracted position, said electrodes being connected in series to provide for a flow of current from one of said electrodes through the work piece, through said conductor and through the work piece again to the other of said electrodes; and actuating means for moving said welding tool between said extended and retracted positions.

4. An apparatus as set forth in claim 3 wherein said welding tool is pivotally connected to said structure for rotation between said extended and retracted positions.

5. In an apparatus of the character described, the combination of: a structure providing an operating station; retaining means carried by said structure adjacent said operating station for holding a work piece; intermittently-operating indexing means for periodically rotating said retaining means so as to bring successive portions of the work piece to said operating station; means for energizing said indexing means; and means for de-energizing said indexing means after one complete revolution of said retaining means, said energizing means including a clutch and said de-energizing means including means for disengaging said clutch, said de-energizing means further including tripping means carried by and rotatable with said retaining means for operating said clutch disengaging means after one complete revolution of said retaining means, said tripping means moving out of contact with said clutch disengaging means after operating same.

6. In an apparatus for assembling a fan which includes a plurality of circumferentially spaced, longitudinal vanes and a pair of end members adapted to be secured to opposite ends of the vanes, the combination of: a structure providing an operating station; retaining means carried by said structure adjacent said operating station for holding the vanes and the end members of the fan in assembled relationship, said retaining means being rotatable to bring successive vanes and successive portions of the end members to said operating station, said retaining means including a pair of unconnected heads respectively adapted to engage opposite ends of the fan; means connected solely to one of said heads for rotating said retaining means and the fan, rotation of said one head being communicated to the other of said heads solely by the fan; and means for securing the vanes of the fan to the end members thereof at said operating station.

7. In an apparatus of the character described, the combination of: a structure providing an operating station; retaining means carried by said structure and movable through said operating station for moving successive portions of a work piece to said operating station; intermittently-operating indexing means for moving said retaining means to move successive portions of the work piece to said operating station; latching means for positively holding each portion of the work piece in said operating station; means for operating said latching means in timed relation with said indexing means; a welding tool carried by said structure adjacent said operating station and movable between extended and retracted positions, said tool being adapted to engage the work piece at said operating station when it is in its extended position, and being spaced from the work piece when it is in its retracted position; and actuating means for moving said tool between said extended and retracted positions in timed relation with said indexing means.

8. An apparatus as set forth in claim 7 wherein said indexing means comprises an eccentric and wherein said means for operating said latching means comprises a cam on said eccentric.

9. In an apparatus for electrically welding two metallic elements together, the combination of: a frame; an electrical conductor carried by said frame and adapted to be contacted by one of said metallic elements; means carried by said frame for positioning said metallic elements relative to said electrical conductor with said one metallic element in contact therewith; a welding tool carried by said frame and movable relative thereto between extended and retracted positions, said tool including a pair of spaced welding electrodes which are adapted to engage the other of said metallic elements at a pair of spaced points when said tool is in its extended position and which are adapted to clear said metallic elements when said tool is in its retracted position, said electrodes being connected in series to provide for a flow of welding current from one of said electrodes to the other through said other metallic element, said one metallic element, said electrical conductor, said one metallic element and said other metallic element in the order specified, thereby welding said metallic elements together at two spaced points; actuating means for moving said welding tool between said extended and retracted positions; and means for moving said electrical conductor and said means for positioning said metallic elements relative thereto through an operating station adjacent said welding tool so as to move successive portions of said metallic elements to said operating station.

10. In an apparatus for welding together elements of a work piece, the combination of: a structure providing an operating station; a retainer for the work piece carried by said structure and movable relative thereto through said operating station so as to move successive portions of the work piece to said operating station; intermittently-operating indexing means operatively connected to said retainer for moving said retainer to move successive portions of the work piece to said operating station; intermittently-operating latching means carried by said structure and engageable with an element connected to said retainer for positively holding each portion of the work piece in said operating station; means for operating said latching means in timed relation with said indexing means; a welding tool carried by said structure adjacent said operating station and movable relative thereto between extended and retracted positions, said tool being adapted to engage the work piece at said operating station when it is in said extended position, and being spaced from the work piece when it is in said retracted position; and actuating means for moving said tool between said extended and retracted positions in timed relation with said indexing means and said latching means.

JOHN H. ABBOTT.

REFERENCES CITED

The following references are of record in the file of this patent:

UNITED STATES PATENTS

| Number | Name | Date |
|---|---|---|
| 1,554,385 | Still | Sept. 22, 1925 |
| 1,751,419 | Phelps | Mar. 18, 1930 |
| 1,868,182 | Sullivan | July 19, 1932 |
| 2,042,322 | Martin | May 26, 1936 |
| 2,082,904 | Podany | June 8, 1937 |
| 2,293,330 | Cogan et al. | Aug. 18, 1942 |
| 2,300,700 | Porter et al. | Nov. 3, 1942 |
| 2,313,789 | Weightman | July 6, 1943 |
| 2,341,459 | Martin | Feb. 8, 1944 |
| 2,468,001 | Taylor et al. | Apr. 19, 1949 |

Certificate of Correction

Patent No. 2,498,905 February 28, 1950

JOHN H. ABBOTT

It is hereby certified that errors appear in the printed specification of the above numbered patent requiring correction as follows:

Column 6, line 15, for "pivot pins 58" read *pivot pins 56*; line 42, for "spokes 20" read *spokes 29*; column 7, line 5, for the word "preliminary" read *preliminarily*; column 12, line 32, for "it" read *its*; column 15, line 69, after "means" insert *for*;

and that the said Letters Patent should be read with these corrections therein that the same may conform to the record of the case in the Patent Office.

Signed and sealed this 30th day of May, A. D. 1950.

[SEAL]

THOMAS F. MURPHY,
*Assistant Commissioner of Patents.*